United States Patent [19]

Kallman

[11] Patent Number: 5,119,979
[45] Date of Patent: Jun. 9, 1992

[54] EYEWEAR HOLDER FOR SHORTS, BATHING SUITS AND THE LIKE

[76] Inventor: Robert A. Kallman, 14 Passaic Ave. - Apt. 3B, Nutley, N.J. 07110

[21] Appl. No.: 612,096

[22] Filed: Nov. 9, 1990

[51] Int. Cl.$^5$ ............................ A45F 3/14; A45F 5/00
[52] U.S. Cl. .................... 224/250; 224/251; 2/94; 2/271
[58] Field of Search .............. 2/94, 250, 271; 224/250, 222, 267, 917, 227, 247, 257, 258, 151, 152, 153, 205, 253, 251, 252; 206/5, 315.1; 248/902

[56] References Cited

U.S. PATENT DOCUMENTS

| | | | |
|---|---|---|---|
| 882,493 | 3/1908 | Dodge | 224/252 |
| 3,148,812 | 9/1964 | Hilsinger, Jr. | 224/250 |

*Primary Examiner*—Henry J. Recla
*Assistant Examiner*—David J. Walczak
*Attorney, Agent, or Firm*—Edwin D. Schindler

[57] ABSTRACT

Apparatus for the retention of eyewear on apparel such as, for example, pants and shirt pockets is disclosed, which includes a fixed loop made of a flexible material. This loop is affixed, preferably, to a top horizontal edge of a pocket or to an upper edge of a waistband of pants, shorts, swimwear, etc. The apparatus of the invention further includes a strap, which is preferably at a lower point on the outer side of a garment. The front end of the strap is preferably attached to the lower point of the permanently affixed loop. The second end of the strap is free, or unattached, and includes on, at least, one side a complementary mating element. An attachment element on the free end of this strap is attachable to the complementary attachment element located on the inner side of the garment; the inner side of the garment being the side opposite to which the user's eyewear is held. Further embodiments of the invention are also disclosed.

6 Claims, 4 Drawing Sheets

EYEWEAR HOLDER FOR SHORTS, BATHING SUITS AND THE LIKE

BACKGROUND OF THE INVENTION

1. Technical Field of the Invention

The present invention relates, generally, to an eyewear holder for shorts, bathing suits and other apparel.

More particularly, the present invention relates to an eyewear holder for clothing items which includes a holding strap which is folded over an item to be held, such as eyewear. The item to be held in place is further secured by an underlying loop holding system which acts to minimize horizontal rotational movement of, for example, the eyeglasses being held. This further loop acts by independently holding one or both of the temple pieces of the eyewear.

2. Description of the Prior Art

Prior to the present invention, the art has generally included accessory holders, such as those disclosed by the inventor's prior patents, i.e., U.S. Pat. No. 4,168,544, issued Sep. 25, 1979; U.S. Pat. No. 4,236,658, issued Dec. 2, 1980; and, U.S. Pat. No. Reissue 30,899, issued Apr. 13, 1982.

In the foregoing art, the article to be held was secured on a flat surface of clothing by a single strap. Such single strap securement apparatus failed to prevent horizontal rotation of items so held. Further, with the holding systems of the prior art, it was not possible to retain eyewear at the waistband height of a pants or a pair of shorts because, among other reasons, the article-holding portion of said holding systems was at a point below the hook-and-loop type attachment means.

SUMMARY OF THE INVENTION

It is, therefore, an object of the present invention to provide holding apparatus for retaining, for example, eyewear at the waistband of an article of clothing.

It is, still, a further object of the present invention to provide holding apparatus for retaining eyewear at a top, horizontal edge of a pocket.

It is an additional object of the present invention to provide holding apparatus for eyewear on apparel that is removably attachable; said apparatus being able to be transferred from one garment to another, i.e., a clip-on model.

It is, yet, an additional object of the present invention to provide a holding apparatus for eyewear on apparel which is able to retain such eyewear in a manner which secures the eyewear against horizontal rotational movements.

It is a further object of the present invention to provide a holding apparatus for eyewear on apparel which will overcome the disadvantages inherent in the prior art.

The foregoing and related objects are accomplished by apparatus for the retention of eyewear on apparel such as, for example, pants and shirt pockets, which includes a fixed loop made of a flexible material, such as cloth. This permanent loop is affixed, preferably, to a top horizontal edge of a pocket or, alternatively, to an upper edge of a waistband of, e.g., pants, shorts, swimwear, etc. Preferably, the fixed loop of the invention is made in a manner similar to that of a conventional belt loop.

The holding apparatus of the present invention further includes a strap, which is preferably, at a lower point on the outer side of the garment. Preferably, the front end is attached to the lower point of the permanently affixed loop. The second end of the strap is free, or unattached, and includes on, at least, one side, attachment means, such as complementary mating means, e.g., Velcro-type hook-and-loop mating means (registered trademark of the Velcro Corporation.)

The attachment means on the free end of this strap is attachable to complementary attachment means located on the inner side of the garment; the inner side of the garment being the side opposite to which the user's eyewear is held. The inner side of a garment would preferably be the waistband of a pair of pants or the inner side of a pocket; the outer side of which the eyewear is to be held. In this manner, the eyewear is held at the highest possible point relative to the upper edge of the waistband or the pocket. Retaining the user's eyewear at the highest possible point relative to the upper edge of a waistband minimizes, the potential for damage to the user's eyewear.

Other objects and features of the present invention will become apparent when considered in combination with the accompanying drawing figures. It should, however, be recognized that the accompanying drawing figures are intended as a means of illustrating the present invention and are not intended as a definition of the limits and scope thereof.

BRIEF DESCRIPTION OF THE DRAWING FIGURES

In the drawing, wherein similar reference numerals denote similar features throughout the several views:

FIGS. 4–7 are partial views, taken in elevation, of a waistband having the securing apparatus of the present invention showing a mode for securing a pair of eyewear to said waistband;

Figure 8:
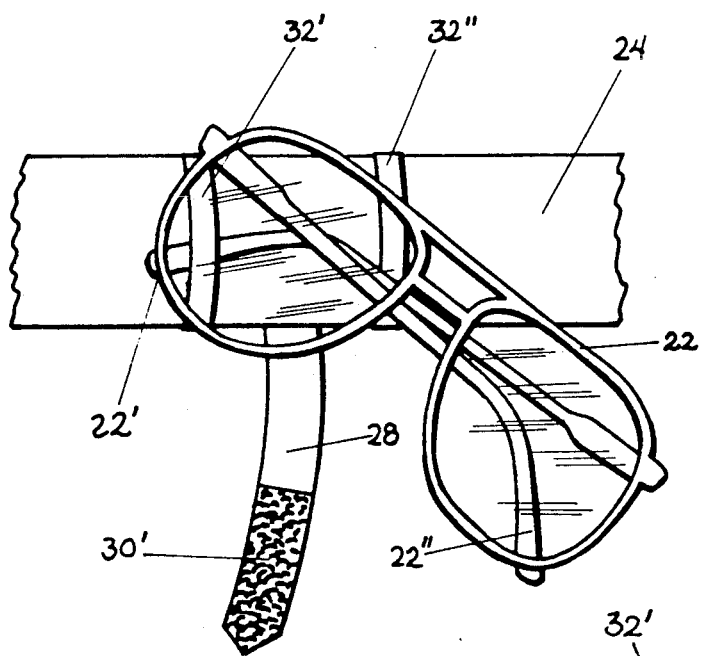
Figure 9:
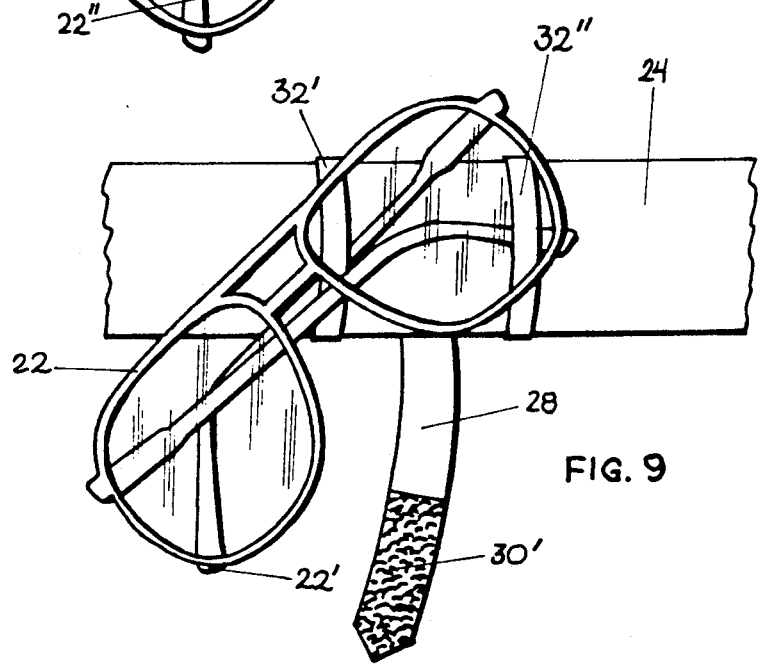
Figure 10:
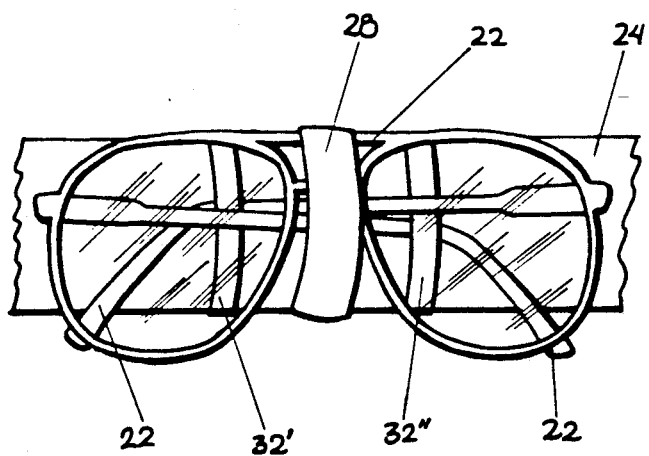
Figure 11:
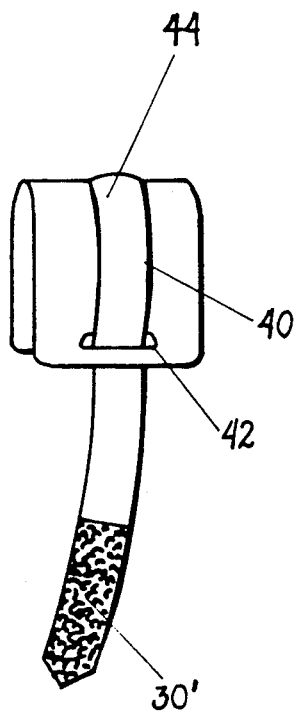

FIGS. 8–10 present partial elevational views of a pair of eyewear being secured to a waistband via an alternative preferred embodiment of the present invention; and, FIGS. 11–14 show a detachable attachment "clip on" inverted-U-shaped piece for use with the apparatus of the present invention attached thereto.

DETAILED DESCRIPTION OF THE DRAWING AND PREFERRED EMBODIMENTS

Figure 1:
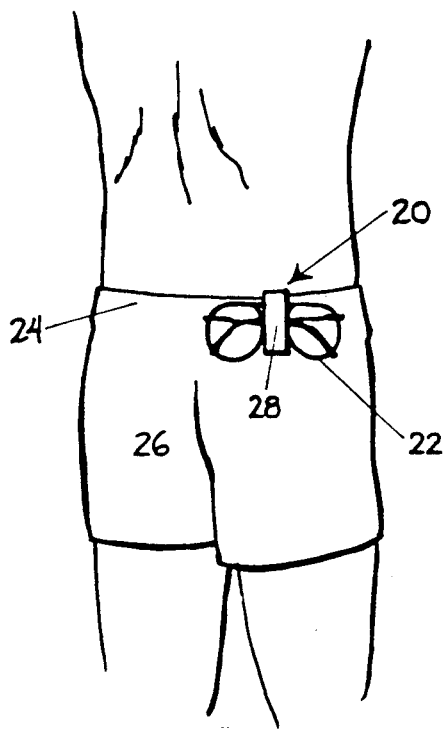
FIG. 1 is an elevational view of a pair of eyewear retained by the apparatus of the present invention to the waistband area of a user.

Turning now, in detail, to an analysis of the drawing figures, FIG. 1 is an elevational view of the securing apparatus 20 of the present invention retaining a pair of eyewear 22 at a waistband 24 of pants 26. Securing apparatus 20 includes an overlapping strip 28, which retains eyewear 22.

Figure 1A:
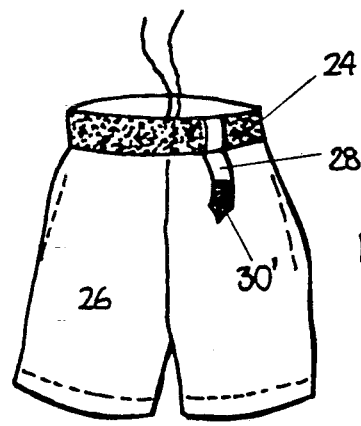
FIG. 1A is a front, elevational view of the holding apparatus of the present invention in an open mode.
Figure 1B:
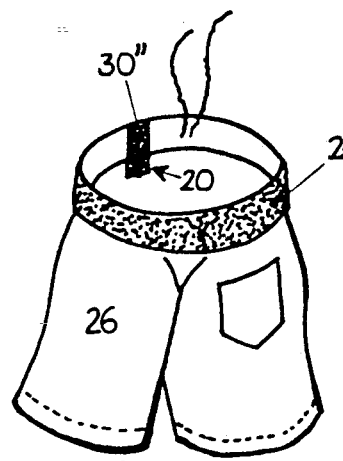
FIG. 1B is a perspective view of the inner side of the front area of the waistband having one part of the attachment means of the present invention (i.e., the loop portion of the hook-and-loop attachment means being shown)

FIG. 1A is a front, elevational view of the securing apparatus 20 of the present invention, as shown in an open mode. FIG. 1B is a perspective view of the inner side of the front area of waistband 24 of pants 26, which includes a portion of attachment means 30.

Specifically, the overlapping strap 28, having attachment means 30 (with hook portion 30' being preferred at the end of strap 28), is in a mode wherein strap 28 is free, i.e., unsecured, to the inner side of waistband 24, which includes a complementary portion of attachment means 30, as best shown in FIG. 1B. The complementary portion 30" of attachment means 30 shown in FIG. 1B is preferably the loop portion of the hook-and-loop fastening means. The preference for this arrangement is that the loop portion of the attachment means is softer, i.e., less coarse, than the hook portion, which is preferably at the end of strap 28. The loop portion, at times when the securing apparatus 20 is in an open mode, for example, could contact the skin of the wearer of pants 26. In order to prevent possible discomfort, it is therefore preferable that the softer loop portion 30" be the complementary portion on the inner side of waistband 24, as per FIG. 1B.

Figure 2:
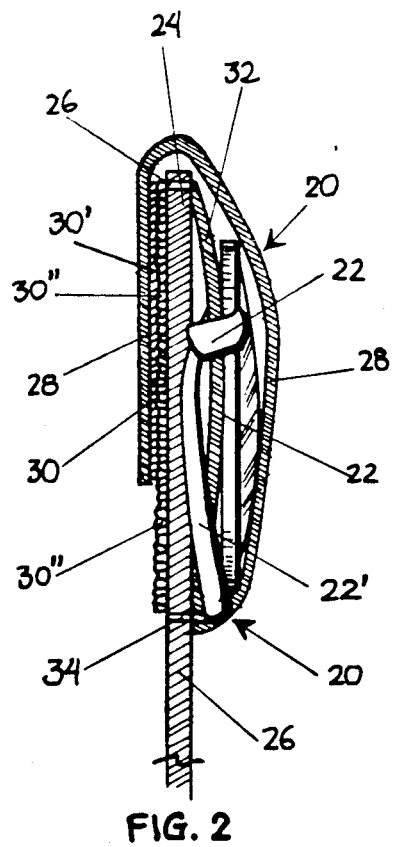
FIG. 2 is a side view, taken along the 2—2 line of FIG. 1, showing a pair of eyewear being secured by the present invention.

FIG. 2 is a side view taken along the 2—2 line of FIG. 1 and shows, in greater detail, eyewear 22 being secured by apparatus 20 of the present invention. Apparatus 20 includes a permanently fixed loop 32 which extends, in a preferred embodiment of the invention, from substantially an upper edge of waistband 24 to a lower point 34 on the outer surface of pants 26. Permanently affixed loop 32 retains one or both temple pieces 22', 22" of eyewear 22, thereby minimizing rotational movement about a horizontal axis.

Securing apparatus 20 further includes strip 28, which preferably has a first end affixed to a point along the outer side of pants 26 and, most preferably, is attached to point 34. Strip 28 has a second end which includes attachment means 30 for the removable attachment of this end to an inner side of pants 26, thereby enveloping eyewear 22 securely in place next to top edge of waistband 24. Attachment means 30, along the inner side of pants 26 is, preferably, comprised of loop portion 30" of complementary mating means 30. In such case, one portion, 30', of the complementary mating means 30, is attached to the second end of strip 28, while a complementary portion 30" of such mating means is attached to the inner side of pants 26.

Preferably, the inner portion 30" of attachment means 30 is the loop-portion of the hook-loop complementary mating attachment means 30, while portion 30' of attachment means 30, on the second end of strip 28, is the hook portion of the hook-loop complementary mating attachment means 30. This arrangement is preferred in order to prevent the user from being scratched, or otherwise discomforted, by the stiff hooks of the hook portion 30' of attachment means 30.

Figure 3:
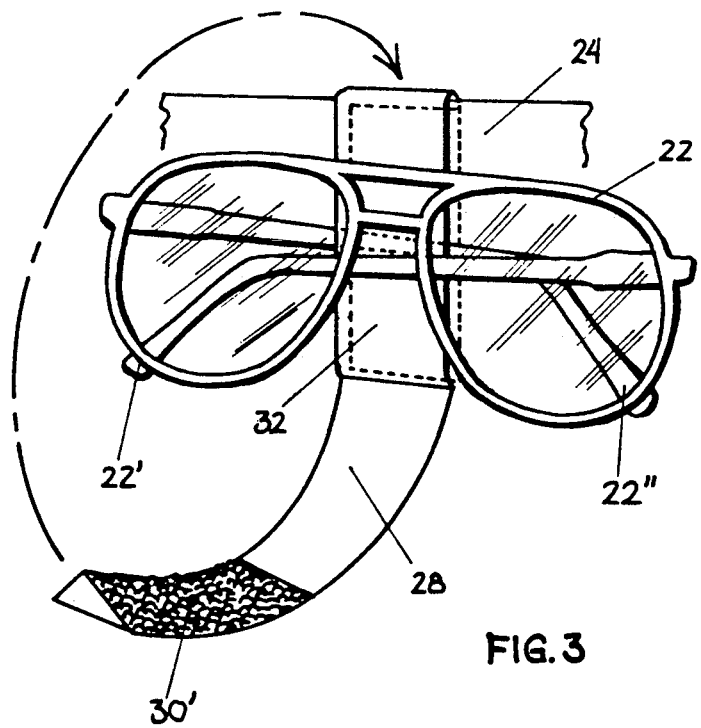
FIG. 3 is a front, perspective view showing a preferred mode of attachment of the present invention, wherein a strap, having attachment of the means, is used to secure said pair of eyewear.

FIG. 3 shows a front, perspective view showing a preferred mode of attachment of eyewear 22 to waistband 24, via strap 28 having hook-loop fastening means 30. After eyewear 22 is placed through fixed loop 32 on the outer side of waistband 24, strap 28 is closed, or secured, by affixing complementary attachment portion 30', of strap 28, to the inner side of waistband 24, which has complementary attachment portion 30" (see, FIG. 1B.)

FIG. 4 shows a partial elevational view of one of the temple pieces 22' of eyewear 22 being inserted into fixed loop 32, which is attached to waistband 24.

FIG. 5 shows eyewear 22 following insertion of temple pieces 22' and 22" into fixed loop 32.

FIG. 6 shows strap 28 in the process of being folded back over the top edge of waistband 24, thereby enveloping and securing eyewear 22 in the manner shown in FIG. 7, upon the mating of complementary fastening parts 30' and 30". This manner of securing is further enhanced by the pressure between complementary fastening parts 30' and 30" and the user's body weight being contained by waistband 24.

FIGS. 8-10 show an alternative embodiment of the present invention which employs two fixed loops, 32' and 32". This construction allows for an easy insertion of both temple pieces 22', 22", for an extra secure hold so as to reduce rotational movement, or tilting, about a vertical axis.

FIGS. 11-14 show an alternative embodiment of the present invention wherein a detachable attachment "clip-on" inverted-U-shaped piece 40 for use with the apparatus of the present invention is presented. Clip-on piece 40 includes a fixed strap 44, which includes one portion analogous to fixed strap 32 and a second portion analogous to strap 28, along with slot 42, through which strap 44 may pass. Strap 44 includes, at its free end, attachment mating means 30', as heretofore described.

For securement to a belt, clip-on piece 40 can have two slots, one slot being on each leg through which strap 44 may pass in order to provide a more secure attachment of the entire holding apparatus.

Figure 12:
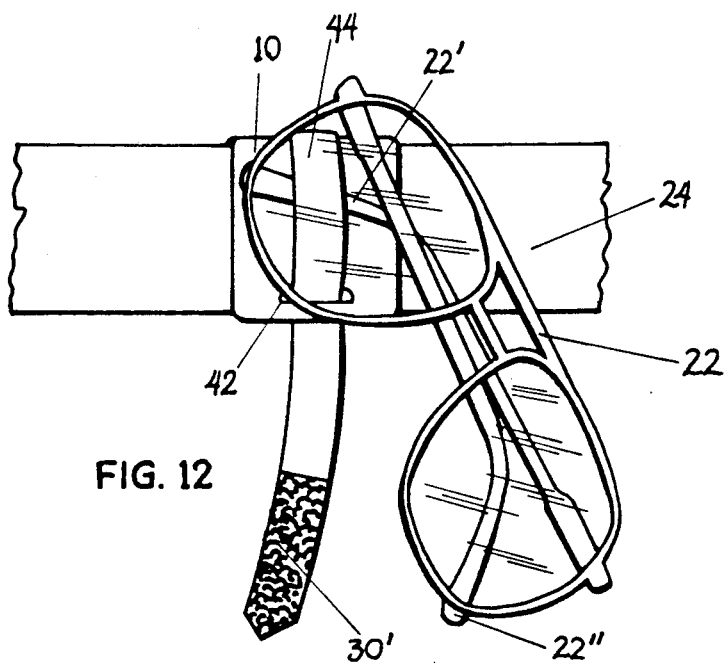
Figure 13:
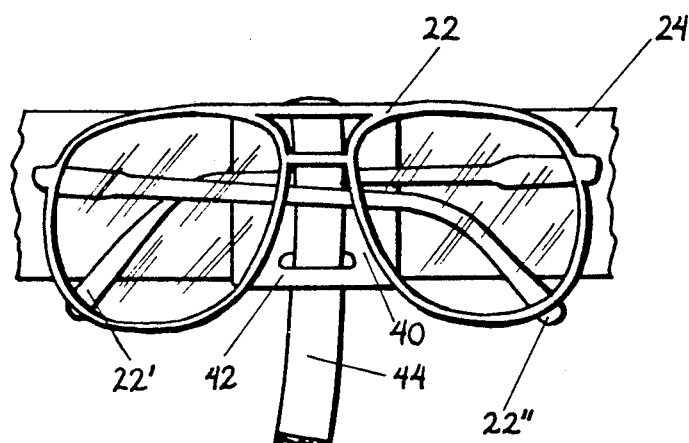
Figure 14:
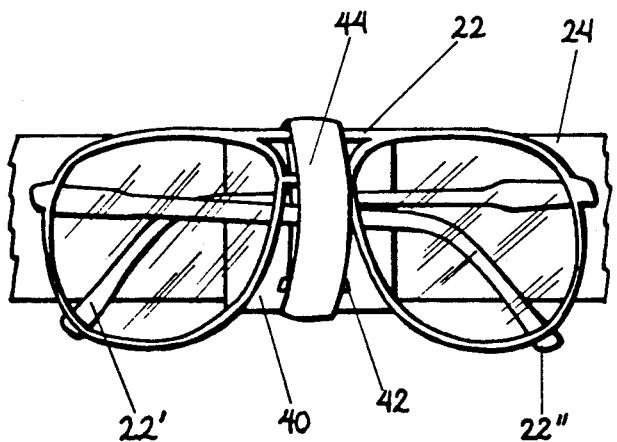

The inverted-U-shape of clip-on piece 40 permits such piece to extend over the top of waistband 24, with each half of clip-on piece 40 being adjacent either the inner or outer surface of the waistband or belt. Each half of clip-on piece 40 includes slots which would be at a point below the lower edge of waistband, or belt, 24. Through one or both slots 42', or 42' and 42", would pass strap 44. Such an arrangement would permit the strap 44 to optionally attach the holding apparatus 40 to a belt by passing strap 44 through both slots. Additionally, such an arrangement would permit the passage of temple pieces 22' and 22" of eyewear 22 to be retained by strap portion 32 when placed through one or both slots, as best shown in FIGS. 12 and 13, and secured by attachment means 30, as per FIG. 14, in the manner previously described.

Finally, it should be recognized that the holder means of the present invention has numerous applications beyond simply the retention of eyewear. Among other uses for the present invention, is use of the holding system for retention of a key chain or key ring. Additionally, the securing means of the present invention may be utilized on a sun visor as, for example, found in an automobile.

While only several embodiments of the present invention have been shown and described, it will be obvious to those of ordinary skill in the art that many modifications may be made to the present invention without departing from the spirit and scope thereof.

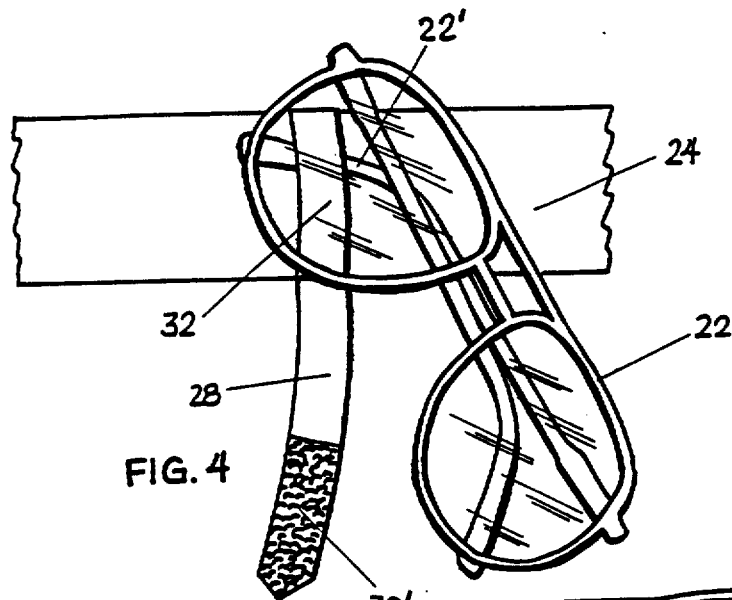
FIG. 4
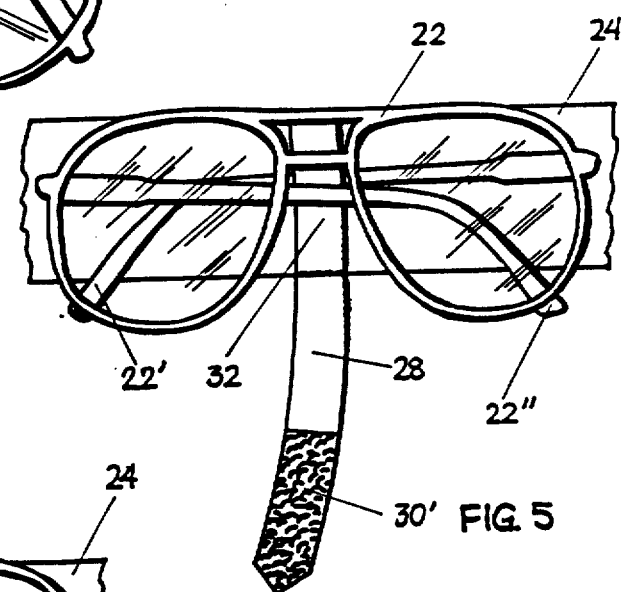
FIG. 5
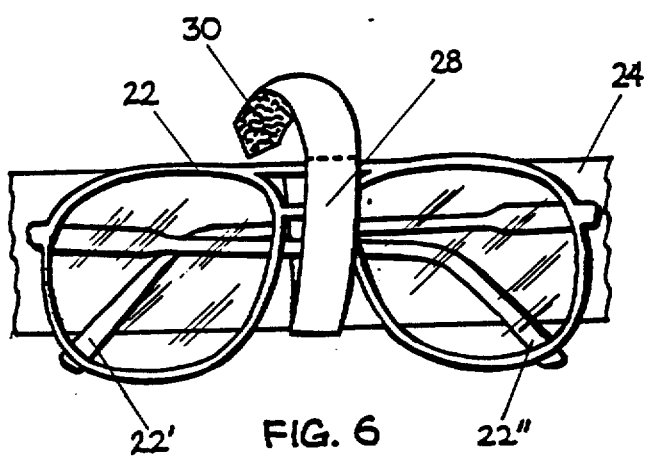
FIG. 6
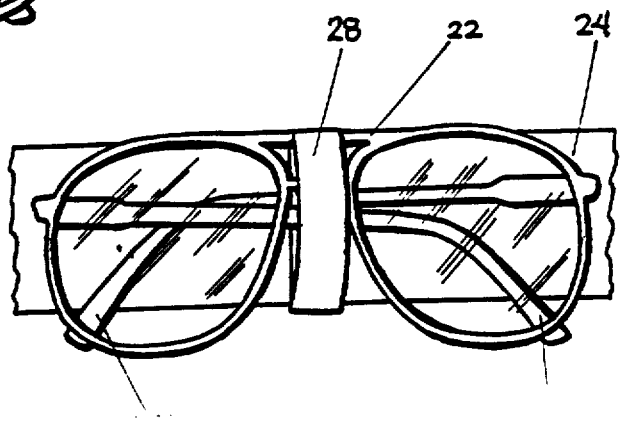

What is claimed is:

1. An apparatus for securing eyeglasses having temple pieces to an article of clothing comprising:
   an article of clothing having a portion defining an edge with adjacent inner and outer surfaces;
   a first strap having a first end which is fixed to the outer surface of the article of clothing adjacent said edge and an opposite end which is fixed to the outer surface remote from said edge to define a loop;

a second strap having a free end and an opposite end which is affixed to the outer surface of the article of clothing adjacent said opposite end of said first strap; and, means for attaching the free end of said second strap to a point on an inner surface of the article of clothing opposite said first strap; whereby the temple pieces of said eyeglasses can be inserted into said loop and said second strap can be wrapped around said eyeglasses over said edge and secured to said second surface.

2. The apparatus according to claim 1, wherein said means for attaching the free end of said second strap includes complementary hook-and-loop attachment portions.

3. The apparatus according to claim 2, wherein said means for attaching includes a complementary loop attachment portion located on said first strap, on the inner side of the article of clothing, and a complementary hook attachment portion located on the free end of said second strap.

4. The apparatus according to claim 1, wherein said means for attaching the free end of said second strap includes complementary hook-and-loop attachment portions.

5. The apparatus according to claim 4, wherein said means for attaching includes a complementary loop attachment portion located on said first strap, on the inner side of the article of clothing, and a complementary hook attachment portion located on the free end of said second strap.

6. The apparatus according to claim 1, wherein a plurality of said first, fixed straps is provided.

* * * * *

UNITED STATES PATENT AND TRADEMARK OFFICE
CERTIFICATE OF CORRECTION

PATENT NO. : 5,119,979

DATED : June 9, 1992

INVENTOR(S) : Robert A. Kallman

Figure 2A:
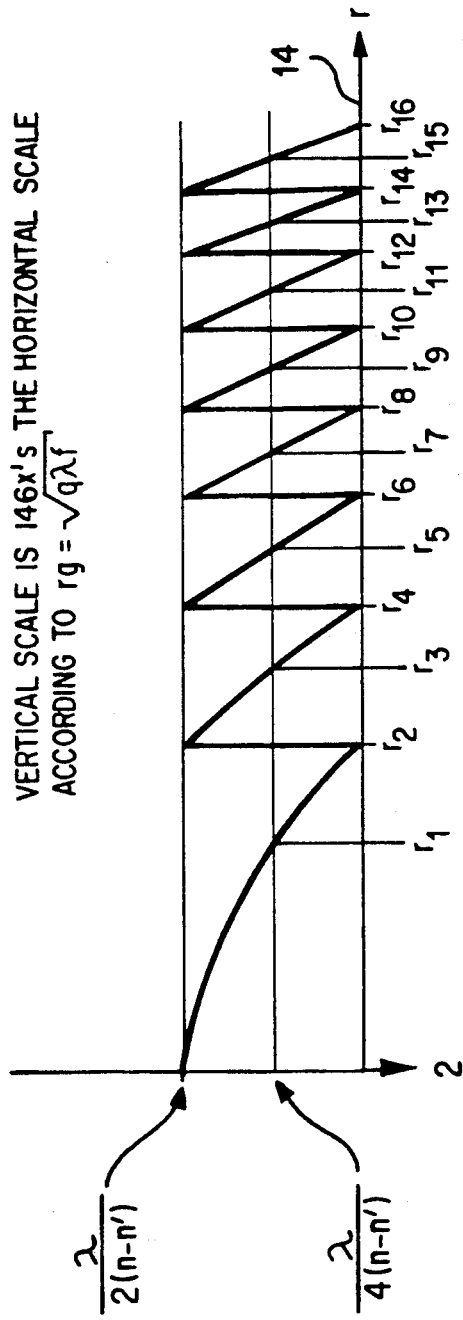
Figure 2B:
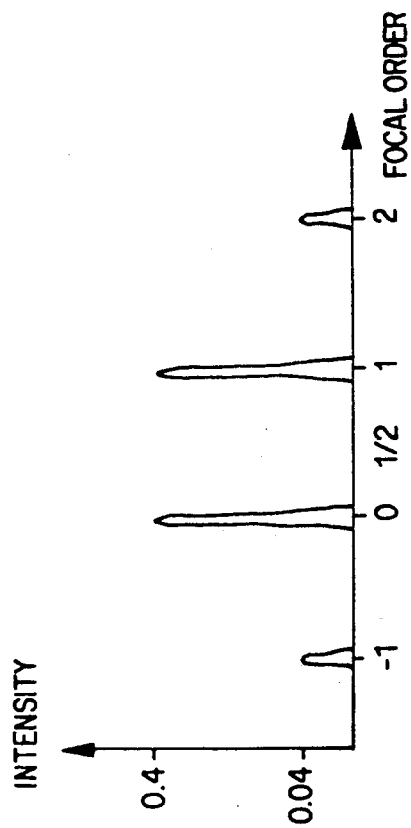

It is certified that error appears in the above-identified patent and that said Letters Patent is hereby corrected as shown below:

Sheet 2, of the drawings, consisting of Figs. 2A and 2B, should be deleted to be replaced with the sheet of drawings, consisting of Figs. 4-7, as shown on the attached page.

Signed and Sealed this

Tenth Day of August, 1993

Attest:

MICHAEL K. KIRK

Attesting Officer

Acting Commissioner of Patents and Trademarks